Aug. 20, 1963   N. R. BENHAM   3,101,205
ANCHOR STRUCTURE FOR BRAKE CABLES AND THE LIKE
Filed Aug. 25, 1958   2 Sheets-Sheet 1
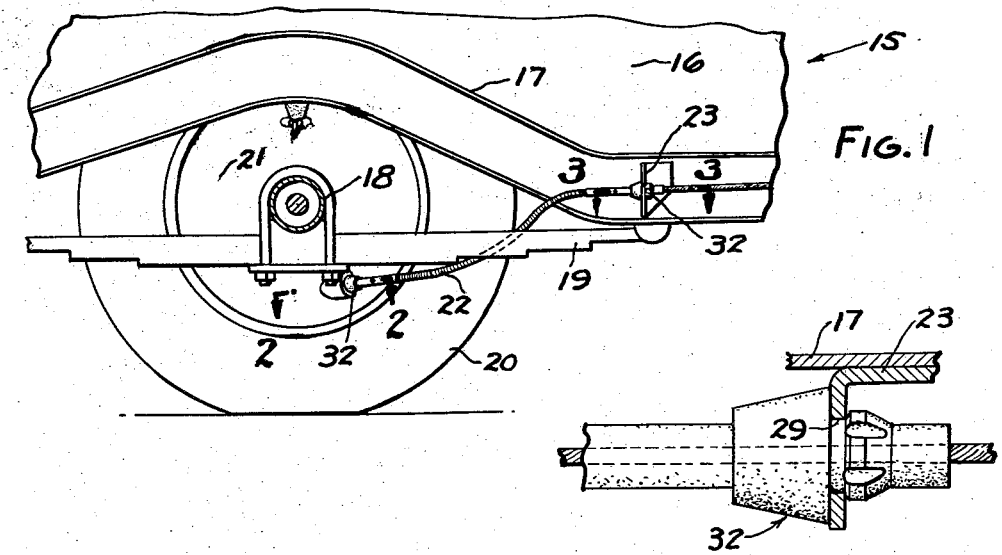
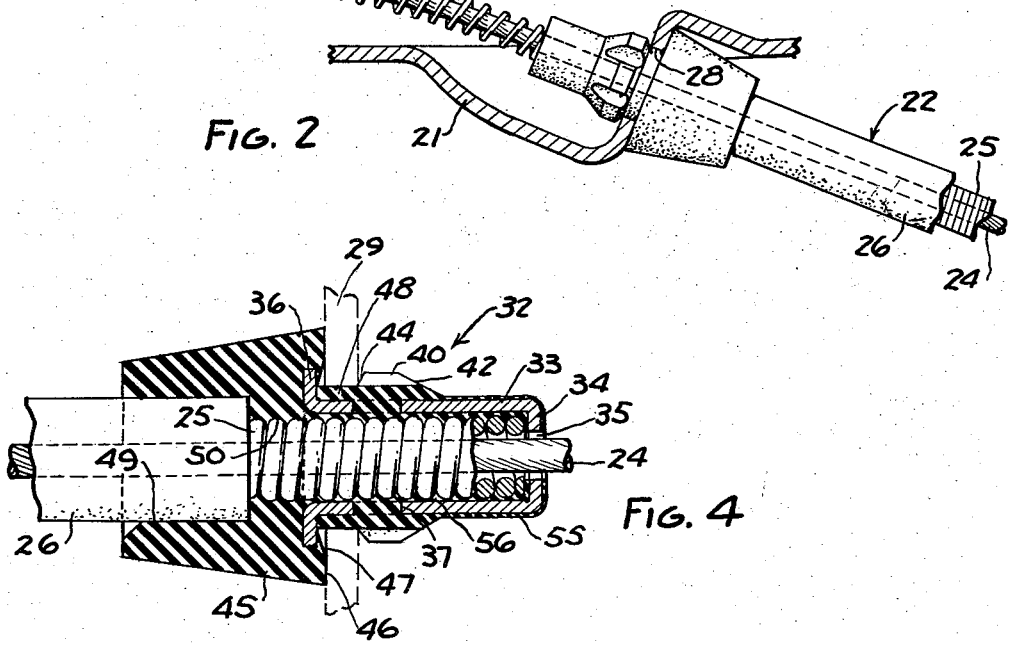
INVENTOR.
NORMAN R. BENHAM
BY
Barnes, Kisselle, Raisch & Choate
ATTORNEYS Aug. 20, 1963   N. R. BENHAM   3,101,205
ANCHOR STRUCTURE FOR BRAKE CABLES AND THE LIKE
Filed Aug. 25, 1958   2 Sheets-Sheet 2

INVENTOR.
NORMAN R. BENHAM
BY
ATTORNEYS

United States Patent Office 3,101,205
Patented Aug. 20, 1963

3,101,205
ANCHOR STRUCTURE FOR BRAKE CABLES
AND THE LIKE
Norman R. Benham, 19339 Bretton Drive, Detroit, Mich.
Filed Aug. 25, 1958, Ser. No. 756,820
6 Claims. (Cl. 285—162)

The anchor structure of this invention is useful generally for securing a flexible cable housing or sheathing to a stationary object. An exemplary use of the invention is in anchoring a flexible hand brake cable sheathing to the frame and to the backing plate of a brake in an automotive vehicle.

Heretofore brake cables have been secured to brake backing plates by means of a metal flange and spring metal prongs provided on the exterior of the cable sheathing. The end of the sheathing and the prongs are forced through the opening in the backing plate. The prongs are sprung radially inwardly in passing through the opening and spring back outwardly when they have passed through the opening to engage the backing plate interior. The flange engages the exterior of the backing plate so that the prongs and flange cooperate to hold the cable sheathing in place.

This construction has a number of disadvantages. The flange and prongs are subject to being corroded and the prongs occasionally break off and lodge within the brake mechanism resulting in damage to the brake. To remove the cable and its sheathing from the backing plate the prongs must be collapsed inwardly and this is usually very difficult. Moreover, the prongs frequently are broken off in the process. Usually it is possible to utilize this construction in connection with backing plates or brackets having only a single thickness. Other devices have been used which include a combination of a flange for engaging one side of a plate and a key insertable in a groove on a thimble on the sheathing for engaging the other side of the plate. This construction is relatively difficult and slow to install, requires access to both sides of the plate and is subject to corrosion and breakage.

An object of this invention is to provide a simple, inexpensive anchor structure improved to eliminate the above disadvantages and to facilitate quick, convenient attachment of the cable sheathing to a backing plate, bracket or the like.

The invention is carried out generally by providing a rigid metal thimble with an external body of rubber or the like having a groove which fits within the opening in a bracket or backing plate. The groove is defined on one side by a shoulder and on the other side by a compressible portion adapted to be forced through the opening. The shoulder and compressible portion position the anchor relative to the plate or bracket with the groove fitting in the opening. The groove is arranged to accommodate plate of various thicknesses. The thimble bottom forms a seat against which the end of the cable sheathing is engaged to force the anchor into the opening. The cable sheathing is frictionally secured within the anchor and the thimble bottom has an aperture through which the brake cable itself passes.

In the drawings:

FIGURE 1 is a fragmentary elevational view illustrating a brake cable secured to an automotive vehicle by anchor structures according to this invention.

FIGURE 2 is an enlarged sectional view on line 2—2 of FIGURE 1 illustrating the brake cable secured to a backing plate.

FIGURE 3 is an enlarged sectional view on line 3—3 of FIGURE 1 showing the brake cable secured to a frame bracket by the present anchor structure.

FIGURE 4 is an enlarged sectional view illustrating structural details of the anchor.

Figure 5:
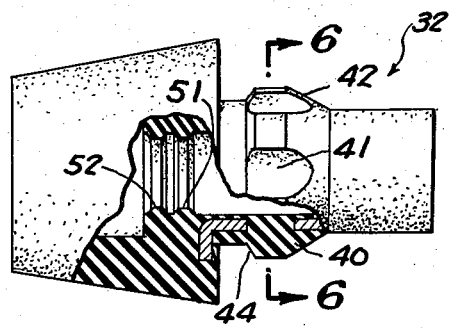
FIGURE 5 is an elevational view of the anchor structure with parts shown in section.
Figure 6:
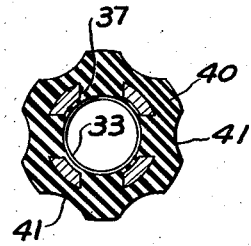
FIGURE 6 is a sectional view on line 6—6 of FIGURE 5.

Shown in FIGURE 1 is a portion of a vehicle 15 having a body 16 mounted on a frame 17 suspended on an axle 18 through a leaf spring 19. Mounted on the axle is a ground engaging wheel 20 and a stationary brake backing plate 21. A flexible parking brake cable 22 is secured at one end to brake backing plate 21 and is secured at its other end to a bracket 23 mounted on vehicle frame 17. Brake cable 22 includes a cable element 24 slidably contained in a flexible sheathing 25 conventionally formed of coiled wire and the wire sheathing is enclosed within a rubber tube 26 which protects sheath 25 and cable 24 from weather, dirt, and the like. Cable element 24 is provided at one end with a lug 27 which is engageable in a conventional manner with the brake mechanism (not shown). Backing plate 21 has an opening 28 through which one end of the brake cable passes and bracket 23 has an opening 29 through which the other end of the brake cable passes.

The anchor 32 of this invention includes a rigid metal tubular thimble 33 having an inturned portion 34 at one end with an opening 35 therein. At its other end the thimble is provided with an out-turned flange 36. The thimble is preferably provided with a number of radial openings 37 at an intermediate location.

Bonded to the exterior of thimble 33 is a body of a resiliently distortable material such as a natural or synthetic rubber of elastomeric material. This body of material includes adjacent an intermediate portion of thimble 33 a number of radially outwardly projecting ribs 40 arranged in alternate circumferential series with a number of grooves or relieved areas 41. These ribs extend to a diameter which is greater than the diameter of openings 28, 29 in the members through which the cable is passed. Each rib 40 has an end face 42 disposed toward the bottom end 34 of the thimble and angled at a relatively mild angle to the longitudinal extent of the thimble. The opposite end face 44 of each rib is relatively abruptly angled to the longitudinal extent of the thimble for a purpose to be described.

The body of rubber also includes an enlarged portion or nipple portion 45 within which thimble flange 36 is embedded. Enlargement 45 provides a surface or shoulder 46 facing ribs 40 and spaced therefrom. Surface 46 is preferably slightly dished at its radially inner portions 47. The portion 48 of the rubber body between shoulder 46 and ribs 40 is dimensioned to fit within an opening 28 or 29 in the brake backing plate or frame bracket respectively. Intermediate portion 48 forms a circumferential groove in the body of rubber. Nipple 45 has an opening 49 into which rubber cable sheathing 26 projects and opening 49 continues in a smaller portion 50 aligned with the interior of thimble 33. Opening 50 is preferably provided with circumferential ribs 51 and 52 (FIGURE 5) for frictionally engaging wire sheathing 25 as shown in FIGURE 4.

In the course of bonding the body of rubber to thimble 33, a rubber flash is formed on the exterior of the thimble as at 55 and a rubber flash is formed on the interior of the thimble as at 56. This flash may not in all cases be necessary but in certain applications it is advantageous as will appear subsequently.

In use, the coiled wire sheathing 25 is inserted into nipple opening 49 through opening 50 and into the interior of thimble 33 until the end of the wire sheathing seats against bottom 34 of the thimble. During this process the outer rubber sheathing of the cable has been forced into nipple opening 49 as illustrated in FIGURE 4 and cable element 24 projects out of the thimble through opening 35. Rubber flash 56 on the interior of the thimble and the internal ribs in nipple opening 50 frictionally secure the brake cable sheathing within the anchor structure. The anchor may then be secured either to brake backing plate 21 or bracket 23.

Assuming that it is to be secured to the backing plate, the bottom end of thimble 33 is inserted through opening 28 and longitudinal force is applied to cable 22 to force the thimble together with rubber ribs 40 through the opening. During this process force is transmitted to the thimble by engagement of the end of the wire sheathing against the seat provided by thimble flange 34. Ribs 40 compress in a radial direction and the compression is facilitated by angled end surfaces 42 which tends to wedge the ribs inwardly and by grooves 41 which provide space into which the distorted rubber may shift. Openings 37 which generally underlie the ribs also facilitate inward distortion of the ribs in passing through opening 28. After ribs 40 have passed through the opening they expand resiliently and shoulder 46 engages the surface of the backing plate opposite from the ribs.

The ribs and shoulder securely position the anchor on the backing plate and the relatively abrupt angle of end faces 44 of the ribs secures the anchor to the backing plate against any forces which would normally tend to dislodge it. Intermediate portion 48 fits snugly within its opening 28 and tends to provide a weather and dirt seal. The dished form of surface 46 provides a weather and dirt seal at the outer peripheral portions of this surface. The rubber flash on the interior and exterior of thimble 33 provide resistance to corrosion of the thimble.

It is important to note that by virtue of the angle of end faces 44 of ribs 40 plates such as backing plate 21 or bracket plate 23 having different widths can be accommodated in the groove between the ribs and shoulder 46.

Thus a single anchor structure according to this invention can be utilized with brackets or plates formed of different thicknesses of stock. This feature is particularly important in the automotive industry where a single make of automobile may be provided with heavier or lighter brake backing plates, etc., according to the body style or model of the car.

To anchor the other end of brake cable 22 to frame bracket 23, an anchor 32 is secured to that end of the cable in the manner described and the anchor itself is attached to the bracket by inserting it into opening 29 in the manner described. Flanges 34 support compressive force in cable sheathing 25 when the sheathing tends to straighten out upon placing in the cable element 24 under tension.

It has been found in practice that a brake cable 22 can be detached from its mounting by simply forcing thimble 33 and its rubber ribs 40 back out of opening 28 or 29 and that then the cable can be reassembled to its mount by again inserting the thimble and ribs through the opening. This can be done a number of times without seriously damaging the anchor structure or reducing its effectiveness.

Figure 7:
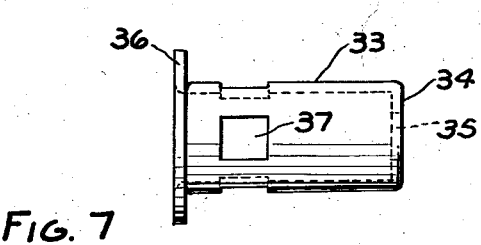
FIGURE 7 is a side view of a thimble used in the anchor separate from the other parts.
Figure 8:
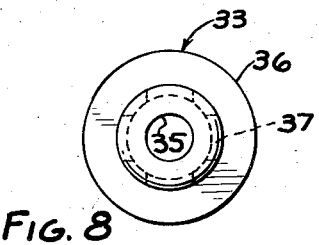
FIGURE 8 is an end view of the thimble shown in FIGURE 7.
Figures 9, 10:
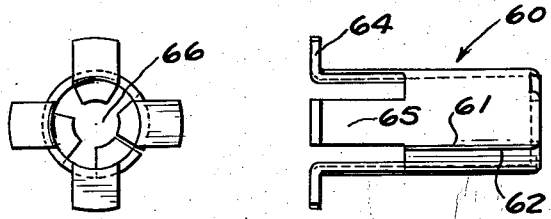
FIGURE 9 is a side view of an alternate form of thimble.
FIGURE 10 is an end view of the alternate form of thimble.
Figure 11:
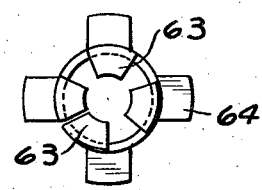
FIGURE 11 is a view of the alternate form of thimble taken from the end opposite that of FIGURE 10.

The thimble structure shown in FIGURES 7 and 8 has the form of a seamless tube and may be made of steel, a sintered metal or any other material which will give it the requisite rigidity. The alternate form of thimble 60 shown in FIGURES 9–11 comprises a metal stamping which has been fashioned to tubular form with its edge faces 61 and 62 apposed. The thimble bottom is provided by a number of turned in tabs 63 and the outward flange is provided by a number of turned out tabs 64 on the ends of circumferentially spaced fingers 65. This thimble is incorporated into the anchor structure in a manner similar to thimble 33. The central opening 66 for the passage of cable element 64 is provided by the spacing between tabs 63.

I claim:

1. Anchor structure for brake cables and the like having an external sheathing, said anchor structure comprising, means forming a thimble having generally rigid side walls lying generally on a cylindrical surface, said thimble being adapted to slidably receive and engage sheathing on cable inserted thereinto, said thimble having at one end an opening through which cable may pass and having at its other end an outwardly turned flange, a body of resiliently distortable material fixed to the exterior of said thimble, said body of material having two longitudinally spaced apart enlargements with an intermediate portion of reduced diameter forming a groove adapted to fit in an opening of predetermined size, said flange being imbedded in one of said enlargements and the cylindrical wall of said thimble providing a generally rigid internal support for the other enlargement, the first mentioned enlargement having a generally radial shoulder adjacent said groove, said other enlargement having an alternate circumferential series of ribs and grooves so that said other enlargement can be resiliently compressed generally to said diameter for passing through an opening, said other enlargement having one end surface disposed toward said one end of said thimble angled relatively mildly to the longitudinal extent of said thimble to facilitate compression of said other enlargement as it is forced through an opening, the other end surface of the other enlargement being relatively abruptly angled to said longitudinal extent to facilitate anchoring said structure within the opening, said shoulder and other end surface being yieldably engageable against opposite faces of a member to which said structure is secured to facilitate securing said structure to members having different thicknesses, said first enlargement having a longitudinal opening therein aligned with the thimble interior, the latter said opening being dimensioned so that the walls defining the same frictionally engage the sheathing of cable inserted into said structure for securing the structure and sheathing together.

2. In an anchor for securing the outer sheathing of a brake cable or the like within an opening, the anchor being of the type having a thimble for receiving the cable sheathing, the thimble having a bottom aperture through which the cable longitudinally movably projects, and including means for securing the thimble within the opening in a member, improved structure wherein said thimble has a side wall to the exterior of which a body of resiliently distortable material such as rubber is fixed, said body of material having longitudinally spaced relatively large diameter portions and an intermediate groove which has a diameter for fitting within an opening of predetermined size, one of said large portions being resiliently radially compressible generally to said diameter for insertion through an opening, said side wall of said thimble being substantially rigid to provide a substantially unyielding internal support relative to which said one large portion is compressible and resiliently expansible, the other of said large portions having a generally radial shoulder adjacent said groove so that when said groove is positioned within an opening said shoulder abuts against the member defining it, whereby said large portions are cooperable to secure said thimble and a sheathed cable engaged thereby in an opening in a member with which said anchor is adapted to be used, said one large portion of said body of resiliently distortable material having a circumferential alternate arrangement of ribs and recesses which facilitate radial compression of said one large portion to said diameter, said thimble having openings which generally underlie said ribs to further facilitate said compression.

3. In an anchor for securing the sheathing of a brake cable or the like within an opening, the anchor being of the type having a thimble for receiving the cable sheathing, the thimble having a bottom with an aperture through which the cable longitudinally projects, and including means for securing the thimble within the opening in a member, improved structure wherein said thimble is adapted to longitudinally slidably receive cable sheathing, said bottom forming an abutment for engagement by cable sheathing inserted into said thimble, said thimble having a side wall to the exterior of which a body of resiliently distortable material such as rubber is fixed, said body of material having longitudinally spaced relatively large diameter portions and an intermediate groove which has a diameter for fitting within an opening of predetermined size, one of said large portions being resiliently radially compressible generally to said diameter for insertion through an opening, said side wall of said thimble being substantially rigid to provide a substantially unyielding internal support relative to which said one large portion is compressible and resiliently expansible, the other of said large portions having a generally radial shoulder adjacent said groove so that when said groove is positioned within an opening said shoulder abuts against the member defining it, whereby said large portions are co-operable to secure said thimble and a sheathed cable engaged thereby in an opening in a member with which said anchor is adapted to be used.

4. The anchor structure defined in claim 3 wherein said other large portion has an opening therethrough aligned with the interior of said thimble with the walls defining the latter said opening being adapted to frictionally engage the sheathing around the cable.

5. Anchor for securing within an opening the outer sheath of a brake cable or the like in which the cable is longitudinally movable within the sheath, said anchor comprising, means forming a thimble with a side wall and an end wall apertured to pass the longitudinally movable cable, said side wall being adapted to longitudinally slidable receive cable sheathing, said end wall forming an abutment for engagement by cable sheathing inserted into said thimble, a body of resiliently distortable material such as rubber fixed to said thimble and having a portion cross dimensioned to fit within an opening of predetermined diameter flanked by relatively larger portions, one of which is resiliently compressible generally to said cross dimension, said side wall of said thimble being substantially rigid to provide a substantially unyielding support relative to which said one large portion is compressible and resiliently expansible, the other of said larger portions defining adjacent the first said portion of said body of material a shoulder which is dimensioned and positioned for longitudinal abutment against a member defining an opening within which said first portion of said body of material fits.

6. The combination defined in claim 5 wherein said thimble has generally radially extending flange which is imbedded in said other larger portion of said body of distortable material, said flange forming a generally rigid support for said other larger portion.

References Cited in the file of this patent

UNITED STATES PATENTS

| 2,246,404 | Ross | June 17, 1941 |
| 2,311,427 | Windelmeyer | Feb. 16, 1943 |
| 2,543,909 | Hatheway | Mar. 6, 1951 |
| 2,555,292 | Poupitch | May 29, 1951 |
| 2,756,078 | Klinger | July 24, 1956 |
| 2,784,865 | Rieke | Mar. 12, 1957 |
| 2,790,961 | Del Camp | Apr. 30, 1957 |
| 2,869,905 | Bratz | Jan. 20, 1959 |

FOREIGN PATENTS

| 382,185 | Great Britain | Oct. 20, 1932 |